US012788660B2

(12) United States Patent
Lee et al.

(10) Patent No.: US 12,788,660 B2
(45) Date of Patent: Nov. 10, 2026

(54) DENTAL UNIT CHAIR

(71) Applicant: DENTIUM CO., LTD., Gyeonggi-do (KR)

(72) Inventors: Jun Back Lee, Gyeonggi-do (KR); Sung Min Chung, Gyeonggi-do (KR)

(73) Assignee: DENTIUM CO., LTD., Gyeonggi-do (KR)

( * ) Notice: Subject to any disclaimer, the term of this patent is extended or adjusted under 35 U.S.C. 154(b) by 197 days.

(21) Appl. No.: 18/580,649

(22) PCT Filed: Oct. 24, 2023

(86) PCT No.: PCT/KR2023/016583
§ 371 (c)(1),
(2) Date: Jan. 19, 2024

(87) PCT Pub. No.: WO2025/089444
PCT Pub. Date: May 1, 2025

(65) Prior Publication Data
US 2025/0213413 A1 Jul. 3, 2025

(51) Int. Cl.
*A61G 15/16* (2006.01)
*A61G 15/02* (2006.01)

(52) U.S. Cl.
CPC ............. *A61G 15/16* (2013.01); *A61G 15/02* (2013.01); *A61G 2203/40* (2013.01)

(58) Field of Classification Search
CPC ......... A61G 15/16; A61G 15/02; A61G 15/14
See application file for complete search history.

(56) References Cited

U.S. PATENT DOCUMENTS 3,986,263 A * 10/1976 Borgelt .................. A61G 15/16 433/33
5,116,223 A * 5/1992 Chung ................... A61C 19/00 433/79
(Continued)

FOREIGN PATENT DOCUMENTS

CN 115590717 A * 1/2023 ............. A61G 15/00
CN 116492187 A 7/2023
(Continued)

OTHER PUBLICATIONS

Supplementary European Search Report issued in 23836337.8 dated Aug. 26, 2025.
(Continued)

*Primary Examiner* — Heidi M Eide
(74) *Attorney, Agent, or Firm* — Secant, IP PLLC; Jay S. Franklin

(57) ABSTRACT

The present invention provides a dental unit chair, including: a base unit; a seat unit that is installed on the base unit and configured to support a patient; a doctor table that is connected to the base unit and has a handpiece mounted thereon; an arm unit that is connected to the base unit so as to be positioned on an opposite side of the doctor table with respect to the seat unit; and a suction unit that includes a deformable suction line having a fixed end connected to the arm unit while communicating with a suction pump and a movable end movable with respect to the fixed end, the deformable suction line being configured to maintain a deformed shape according to the movement of the movable end and formed to cause a foreign object sucked from the patient to flow in a direction toward the suction pump while sequentially passing through the movable end and the fixed end.

12 Claims, 4 Drawing Sheets

(56) References Cited

U.S. PATENT DOCUMENTS

| | | | | |
|---|---|---|---|---|
| 2010/0159415 | A1* | 6/2010 | Benfield | A61G 15/16 433/79 |
| 2025/0288479 | A1* | 9/2025 | Bäthge | A61C 3/00 |

FOREIGN PATENT DOCUMENTS

| | | | | | |
|---|---|---|---|---|---|
| EP | 2008631 | A1 | * | 12/2008 | A61G 15/16 |
| JP | H07-213541 | A | | 8/1995 | |
| JP | 2010284333 | A | * | 12/2010 | |
| JP | 107175536 | B2 | | 11/2022 | |
| JP | 2003000659 | A | * | 1/2023 | A61G 15/16 |
| KR | 950009628 | Y1 | * | 11/1995 | A61G 15/16 |
| KR | 101745434 | B1 | | 6/2017 | |
| KR | 10-2022-0015686 | A | | 2/2022 | |
| KR | 10-2022-0153153 | A | | 11/2022 | |
| WO | WO-2008062100 | A1 | * | 5/2008 | A61G 15/16 |
| WO | WO-2017073986 | A1 | * | 5/2017 | A61C 1/08 |
| WO | WO-2022239928 | A1 | * | 11/2022 | A61G 15/10 |

OTHER PUBLICATIONS

International Search Report and Written Opinion issued in PCT/KR2023/016583 dated Jul. 18, 2024.

* cited by examiner

DENTAL UNIT CHAIR

TECHNICAL FIELD

The present invention relates to a unit chair used to treat a patient in dentistry.

BACKGROUND ART

Generally, during dental treatment, a unit chair is used to examine a patient's oral cavity and perform treatment on teeth. The unit chair includes multi-directional driving means that may adjust a patient's posture according to a manager's operation. The unit chair also has functions such as providing compressed air, sucking air, supplying water, and draining water.

Even if the patient's posture is freely changed, dental treatment is a burdensome task for a doctor to do alone. During the dental treatment, an operation of processing teeth or gums with various types of handpieces and assistant operations of sucking foreign objects such as saliva, blood, and tooth debris are performed simultaneously. It is common for a doctor to perform processing operations and assistant personnel to perform assistant operations.

As labor costs increase and manpower shortages worsen, the need for the unit chair that enables a doctor to perform the assistant operations as well as the processing operations is increasing.

The above-described background art is technical information retained by the inventor to derive embodiments of the present invention or acquired by the inventor while deriving the present invention, and thus should not be construed as art that was publicly known prior to the filing date of the present application.

DISCLOSURE

Technical Problem

The present invention provides a dental unit chair that does not require assistant personnel for an air intake operation, and prevents a configuration for implementing the air intake operation from restricting doctor's treatment activities.

Technical Solution

According to an aspect of the present invention, a dental unit chair includes: a seat unit that is configured to switch between a first posture for supporting a patient to sit down and a second posture for supporting the patient to lie down; a body unit that is positioned on one side of the seat unit and configured to maintain an independent state when switching between the first posture and the second posture; an arm unit that is installed on the body unit to switch between a third posture and a fourth posture different from the third posture; and a suction unit that includes a fixed suction line arranged to extend in an inside of the arm unit and a deformable suction line connected to the arm unit while communicating with the fixed suction line, positioned outside the arm unit, and configured to maintain a deformed shape, the deformable suction line being in a state in which a foreign object is sucked from the patient as its entrance is converted from a fifth posture to a sixth posture close to the patient lying in the second posture, in which the suction unit further includes an intermediation suction line that is built into the body unit and configured to make the fixed suction line communicate with a suction pump, and the foreign object flows in a direction toward the suction pump while sequentially passing through the deformable suction line, the fixed suction line, and the intermediate suction line.

The arm unit may include an end surface forming a plane along a direction intersecting an extension direction thereof, and the deformable suction line may be connected to the arm unit so as to protrude from the end surface.

The suction unit may further include a holder coupled to the arm unit, and a portion of the deformable suction line that is close to the fixed suction line may maintain an arrangement along an extension direction of the holder by a support of the holder.

The dental unit chair may further include an assist table that is switchably connected to the arm unit between a seventh posture and an eighth posture, in which a coupling surface of the arm unit to which the deformable suction line is coupled may be the same surface as or a surface parallel to an upper surface of the assist table.

The deformable suction line may include: a flexible tube that communicates with the fixed suction line; and a shape retaining body that surrounds the flexible tube and is configured to maintain a shape of the flexible tube.

The dental unit chair may further include: a detection unit that is configured to detect that the deformable suction line is positioned in a corresponding area corresponding to the sheet unit; and a control unit that operates the suction pump communicating with the deformable suction line based on a detection result of the detection unit.

The detection unit may include: a detected element that is installed on the deformable suction line; and a detection element that is configured to generate an electrical signal according to interaction with the detected element positioned in the corresponding area.

According to another aspect of the present invention, a dental unit chair includes: a base unit; a seat unit that is installed on the base unit and configured to support a patient; a doctor table that is connected to the base unit and has a handpiece mounted thereon; an arm unit that is connected to the base unit so as to be positioned on an opposite side of the doctor table with respect to the seat unit; and a suction unit that includes a deformable suction line having a fixed end connected to the arm unit while communicating with a suction pump and a movable end movable with respect to the fixed end, the deformable suction line being configured to maintain a deformed shape according to the movement of the movable end and formed to cause a foreign object sucked from the patient to flow in a direction toward the suction pump while sequentially passing through the movable end and the fixed end.

The dental unit chair may further include an assist table that is rotatably connected to the arm unit, in which the deformable suction line may be positioned spaced apart from the assist table to maintain a state independent of a rotation of the assist table.

The dental unit chair may further include: a detection unit that is configured to detect that the deformable suction line is positioned in a corresponding area corresponding to the sheet unit; and a control unit that operates the suction pump communicating with the deformable suction line based on a detection result of the detection unit.

According to still another aspect of the present invention, a dental unit chair includes: a base unit; a seat unit that is installed on the base unit and configured to support a patient; a body unit that is connected to one side of the base unit; an arm unit that is connected to the body unit; and a suction unit that includes a fixed suction line arranged to extend in an inside of the arm unit, a deformable suction line mounted on the arm unit while communicating with the fixed suction line and configured to maintain a deformed shape, and an intermediation suction line configured to make the fixed suction line communicate with a suction pump.

The body unit may include a housing and a pole connected to the housing, the arm unit may be connected to the pole, and the intermediation suction line may be arranged to extend into the pole and the housing.

The arm unit may include an end surface forming a plane along a direction intersecting an extension direction thereof, and the deformable suction line may be connected to the arm unit so as to protrude from the end surface.

The suction unit may further include a holder coupled to the arm unit, and a portion of the deformable suction line that is close to the fixed suction line may maintain an arrangement along an extension direction of the holder by a support of the holder.

The dental further include: unit chair may a detection unit that is configured to detect that the deformable suction line is positioned in a corresponding area corresponding to the sheet unit; and a control unit that operates the suction pump communicating with the deformable suction line based on a detection result of the detection unit.

Advantageous Effects

According to a dental unit chair according to the present invention configured as described above, a seat unit is independently provided with an arm unit, a suction unit installed inside and outside the arm unit includes a fixed suction line that is disposed inside the arm unit and a deformable suction line that is disposed outside the arm unit and maintaining a deformed shape, and the deformable suction line absorbs foreign objects originating from a patient lying on the seat unit and does not restrict doctor's treatment activities.

MODE FOR INVENTION

Figure 1:
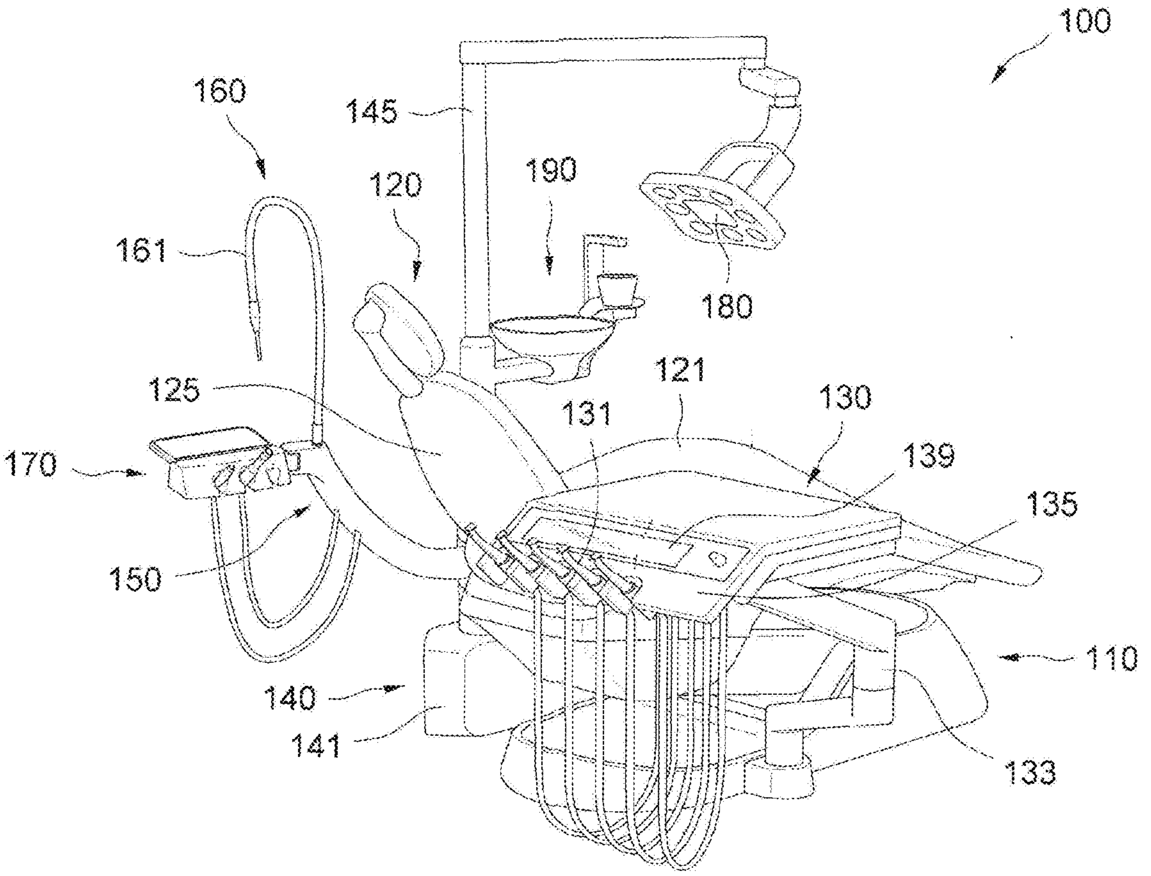
FIG. 1 is a perspective view illustrating a state of a dental unit chair 100 according to an embodiment of the present invention.

Hereinafter, exemplary embodiments of the present invention will be described in detail with reference to the accompanying drawings.

However, the present invention is not limited to embodiments set forth herein, but may be modified variously and implemented in various different forms. However, the embodiment is provided to ensure that the disclosure of the present invention is complete and to fully inform those skilled in the art of the scope of the invention. Therefore, the present invention is not limited to the embodiments disclosed below, but it should be understood that substitution or addition of components of one embodiment and components of another embodiment include all changes, equivalents, and substitutions included in the technical spirit and scope of the present invention.

It should be understood that the accompanying drawings are provided only in order to allow exemplary embodiments of the present invention to be easily understood, and the spirit of the present invention is not limited by the accompanying drawings, but includes all the modifications, equivalents, and substitutions included in the spirit and the scope of the present invention. In the drawings, components may be expressed exaggeratedly large or small in size or thickness for convenience of understanding, etc., but the scope of protection of the present invention should not be construed as limited.

Terms used in the present specification are used only in order to describe specific implementation examples or embodiments rather than limiting the present invention. Singular forms are intended to include plural forms unless the context clearly indicates otherwise. In the specification, terms such as ~include, ~consist of, etc., are intended to designate the existence of features, numbers, steps, operations, components, parts, or a combination thereof described in the specification. Also, it should be understood that terms such as "~include" and "~consist of" do not preclude the existence or addition possibility of one or more other features or numbers, steps, operations, components, parts, or combinations thereof.

Terms including ordinal numbers such as "first," "second," etc., may be used to describe various components, but the components are not to be construed as being limited to the terms. The terms are used only to distinguish one component from another component.

It is to be understood that when one element is referred to as being "connected to/communicate with" or "coupled to" another element, it may be connected directly to or coupled directly to another element or be connected to/communicate with or coupled to another element, having the other element intervening therebetween. On the other hand, it should be understood that when one element is referred to as being "connected directly to/communicate with" or "coupled directly to" another element, it may be connected to or coupled to another element without the other element interposed therebetween.

When a component is referred to as being "on top" or "below" another component, it should be understood that not only is it disposed directly on top of other components, but there may also be other components in between.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in the present specification.

FIG. 1 is a perspective view illustrating a state of a dental unit chair 100 according to an embodiment of the present invention.

Referring to FIG. 1, the dental unit chair 100 may include a base unit 110, a seat unit 120, a doctor table 130, a body unit 140, an arm unit 150, a suction unit 160, an assist table 170, a lighting lamp 180, and a cuspidor 190.

The base unit 110 is configured to support the seat unit 120. The base unit 110 may be formed to be supported on a bottom surface. A driving means (not illustrated) for adjusting a posture of the seat unit 120 may be built in the base unit 110. In some cases, the base unit 110 may be treated as forming part of the seat unit 120.

The seat unit 120 is configured to support a patient. The seat unit 120 may support the patient while sitting in a first posture. The seat unit 120 may also support the patient while lying down in a second posture. To switch between the first posture and the second posture, angles of a lower support part 121 and an upper support part 125 of the seat unit 120 may be adjusted independently of each other. In general, an angle adjustment range of the upper support part 125 may be larger than that of the lower support part 121.

The doctor table 130 is for holding a handpiece 131 that a doctor uses. The handpiece 131 is a tool for various processing operations on teeth, an alveolar bone, etc. For the handpiece 131, compressed air, air suction power, rotational driving power, etc., may be provided through the base unit 110. To this end, the doctor table 130 may be connected to the base unit 110 through an arm 133 or to a pole 145 to be described below. An end portion of the arm 133 may be provided with a frame 135, and the handpiece 131 may be mounted on the frame 135. A manipulator 139 is also installed on the frame 135, and a doctor may control the posture of the seat unit 120 and the like using the manipulator 139.

The body unit 140 may include components related to providing compressed air, air suction power, rotational driving power, etc. The body unit 140 may serve to connect the handpiece 131, etc., to an air compressor, a suction pump, a water purifier, etc., positioned in a separate machine room. The body unit 140 may be arranged on one side of the seat unit 120 and positioned on a side opposite to the doctor table 130 based on the seat unit 120. The body unit 140 maintains an independent state of the seat unit 120 switched between the first posture and the second posture. Therefore, a doctor does not have to worry about interference with the body unit 140 when changing the posture with respect to the seat unit 120. The body unit 140 may have the housing 141 and the pole 145. When the housing 141 is supported on the bottom surface, the pole 145 may be connected to the housing 141 and arranged to extend upward.

The arm unit 150 is rotatably connected to the body unit 140. Specifically, the arm unit 150 is connected to the pole 145 and may have a shape extending in a direction away from the pole 145. The arm unit 150 connected to the pole 145 is positioned on the opposite side of the doctor table 130 with respect to the seat unit 120. The arm unit 150 is configured to switch between a third posture and a fourth posture. The fourth posture may be a posture closer to the seat unit 120 than the third posture. Switching between the third posture and the fourth posture may be done manually. Even if the switching is performed automatically, the switching may occur at a time different from the switching time between the first posture and the second posture. As a result, the arm unit 150 and the seat unit 120 do not interfere with each other during their respective switching processes.

The suction unit 160 is for suctioning foreign objects from the patient and is connected to the arm unit 150. The suction unit 160 is positioned outside the arm unit 150 and has a deformable suction line 161 that maintains a deformed shape according to an operator's manipulation. The deformable suction line 161 may be switched between a fifth posture and a sixth posture. The sixth posture may be a posture closer to a patient than the fifth posture. In the sixth posture, an inlet of the deformable suction line 161 will be placed in a position where the foreign objects can be sucked from the patient lying in the second posture.

The assist table 170 may be rotatably connected to the arm unit 150. The assist table 170 may be switched between a seventh posture and an eighth posture. The eighth posture may be a posture closer to the seat unit 120 than the seventh posture. Tools used by assistant personnel, such as an inhaler 171 or a scaler, are mounted on the assist table 170. When the assistant personnel do not participate in treatment, the role of the inhaler 171 may be replaced by the suction unit 160. The suction unit 160 may be operated by a doctor.

The lighting lamp 180 generates light to illuminate a patient's oral cavity. The lighting lamp 180 may be installed on the upper end of the pole 145.

The cuspidor 190 receives saliva, foreign objects, etc., that are spit out by a patient. The cuspidor 190 may be connected to a water supply line through which purified water is supplied to the patient.

Figure 2:
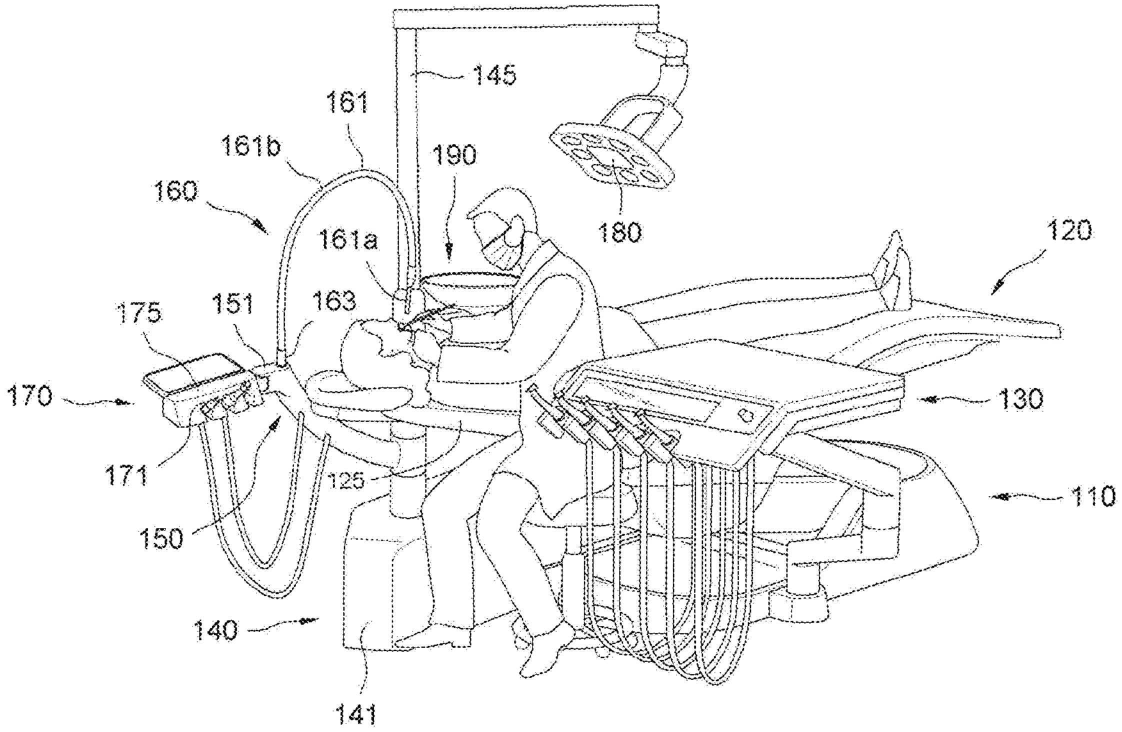
FIG. 2 is a perspective view illustrating another state of the dental unit chair 100 of FIG. 1.

FIG. 2 is a perspective view illustrating another state of the dental unit chair 100 of FIG. 1.

Referring to FIG. 2, the seat unit 120 is adjusted to the second posture, so a patient may lie down on the seat unit 120. For the treatment of the patient, as the seat unit 120 is adjusted to the fourth posture, a free end of the deformable suction line 161 may be positioned close to the upper support part 125. The posture adjustment of the deformable suction line 161 may be performed by a doctor. Since the deformable suction line 161 maintains the adjusted fourth posture on its own, there is no need for anyone to hold the suction unit 160 during treatment. After the treatment is completed, a doctor simply returns the deformable suction line 161 to the third posture.

The deformable suction line 161 may be composed of a flexible tube 161*a* and a shape retaining body 161*b* surrounding the same. The flexible tube 161*a* is made of a bendable material, and in the inside of the flexible tube 161*a*, air and foreign objects flow according to the operation of the suction pump. The shape retaining body 161*b* allows the flexible tube 161*a* to maintain its bent shape. The shape retaining body 161*b* may have a structure in which a band is wound in a spiral shape, or the like.

The deformable suction line 161 may be coupled to an end surface 151 of the arm unit 150. The end surface 151 may be a plane along a direction that generally intersects an extension direction of the arm unit 150. The end surface 151 may be the same surface as an upper surface 175 of the assist table 170 or may be parallel to the upper surface 175.

The deformable suction line 161 is connected to the arm unit (150) so as to protrude from the end surface 151. In order to maintain the deformable suction line 161 in a generally perpendicular posture to the end surface 151, a holder 163 may be coupled to the end surface 151. The end surface 151 may be referred to as a coupling surface in that the holder 163 is coupled to the end surface 151. The holder 163 is coupled to the arm unit 150 and may be made of a material that is not deformed. The holder 163 may have a generally hollow pipe shape. Accordingly, the portion of the deformable suction line 161 close to the arm unit 150 may stably maintain its arrangement along the extension direction of the holder 163.

The deformable suction line 161 does not restrict doctor's activities during the doctor's treatment process. Specifically, a doctor pushes his lower body under the upper support part 125 while sitting on a simple chair. In that state, the doctor may move slightly left and right, forward and backward. An area of movement of the doctor is completely separated from the position and movement range of the deformable suction line 161. Therefore, the deformable suction line 161 may be structurally prevented from restricting the doctor's treatment activities.

Figure 3:
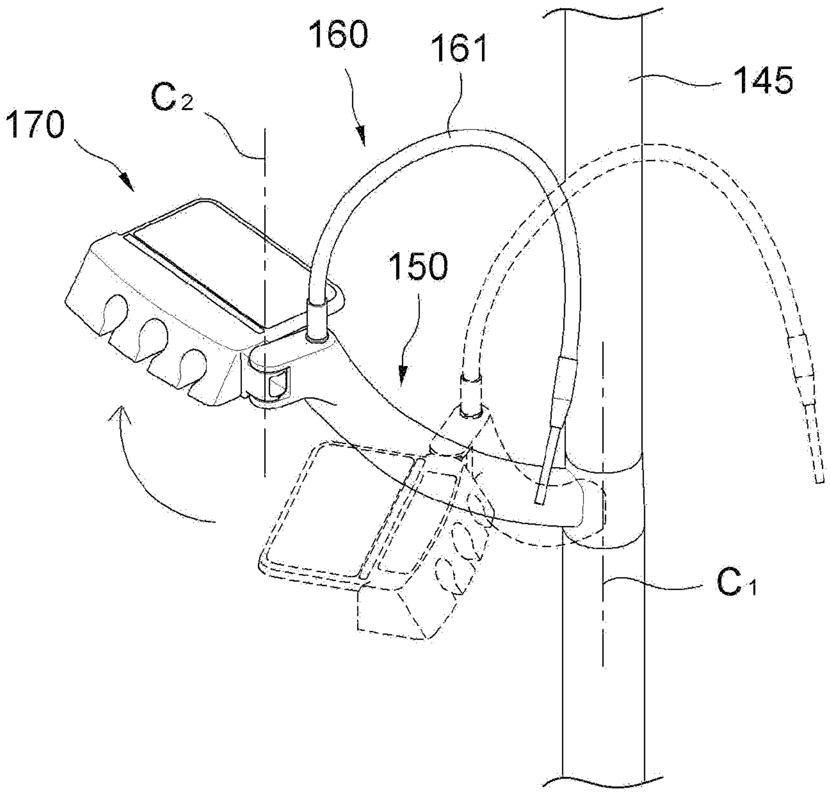
FIG. 3 is a perspective view for describing the correlation between a suction unit 160 and an assist table 170 in FIG. 2.

FIG. 3 is a perspective view for describing the correlation between a suction unit 160 and an assist table 170 in FIG. 2.

Referring to FIG. 3, the arm unit 150 may be rotatably installed with respect to the pole 145 about a first rotation axis C1. The switching between the third posture and the fourth posture is achieved by the rotation of the arm unit 150 about the first rotation axis C1.

The assist table 170 may be rotatably installed with respect to the arm unit 150 about a second rotation axis C2. The switching between the seventh posture and the eighth posture is achieved by the rotation of the assist table 170 about the second rotation axis C2. The second rotation axis C2 may be parallel to the first rotation axis C1.

The deformable suction line 161 may be positioned spaced apart from the assist table 170. As a result, the de formable suction line 161 may not cause structural interference during the switching between the seventh posture and the eighth posture of the assist table 170.

Figure 4:
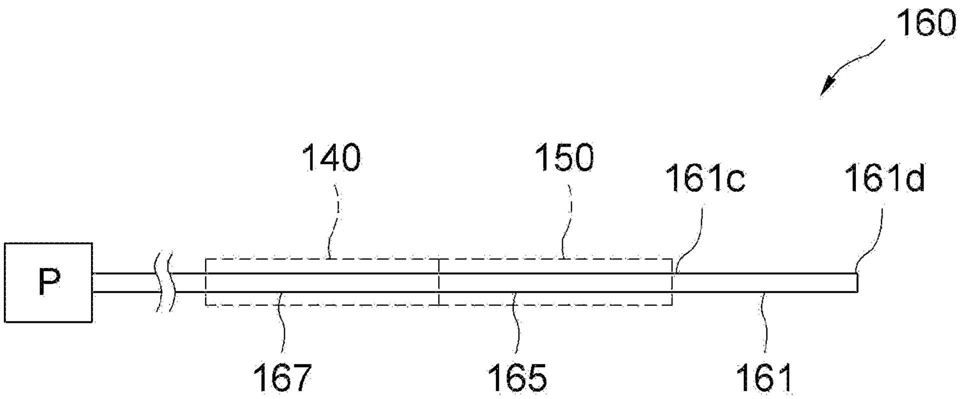
FIG. 4 is a conceptual diagram illustrating in detail a configuration of the suction unit 160 of FIG. 2.

FIG. 4 is a conceptual diagram illustrating in detail a configuration of the suction unit 160 of FIG. 2.

Referring to FIG. 4, the suction unit 160 may further include a fixed suction line 165 and an intermediation suction line 167 in addition to the deformable suction line 161.

When a fixed end 161*c* of the deformable suction line 161 is a part whose position is fixed by being coupled to the arm unit 150, a movable end 161*d* is a part whose position changes depending on the switching between the fifth posture and the sixth posture.

The fixed end 161*c* of the deformable suction line 161 is connected to the fixed suction line 165. The fixed suction line 165 is arranged to extend in the inside of the arm unit 150. The flexible tube 161*a* of the deformable suction line 161 communicates with the fixed suction line 165.

The fixed suction line 165 is connected to the intermediation suction line 167. The intermediation suction line 167 is built into the body unit 140 and communicates with the suction pump P (see FIG. 7). The foreign object may flow in the suction pump P while sequentially passing through the deformable suction line 161, the fixed suction line 165, and the intermediation suction line 167.

Figure 5:
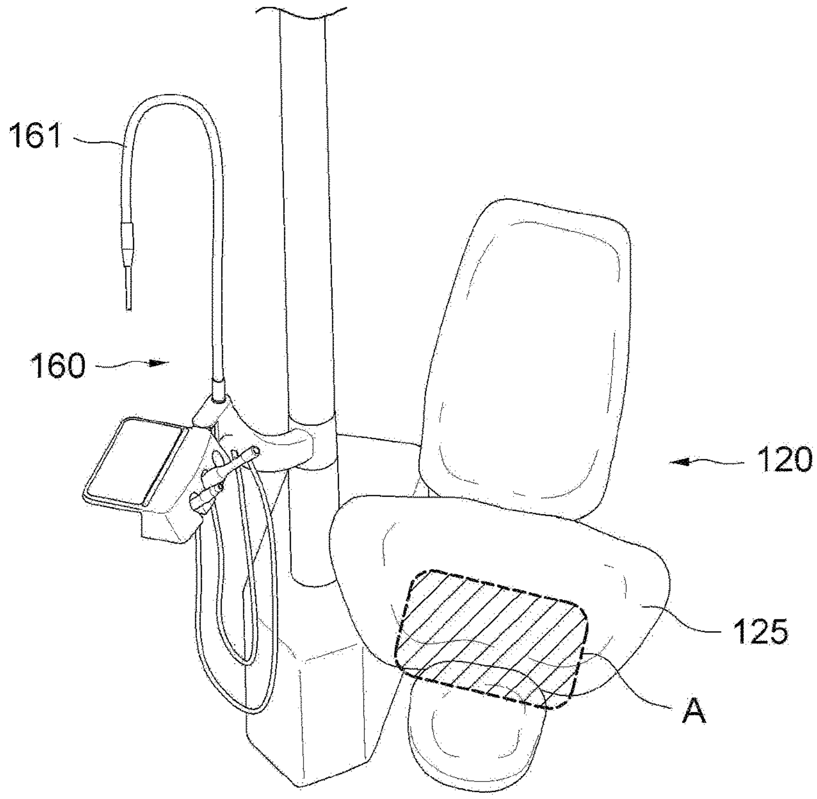
FIGS. 5 and 6 are perspective views for describing the relationship between a position of the suction unit 160 and a corresponding area A.
Figure 6:
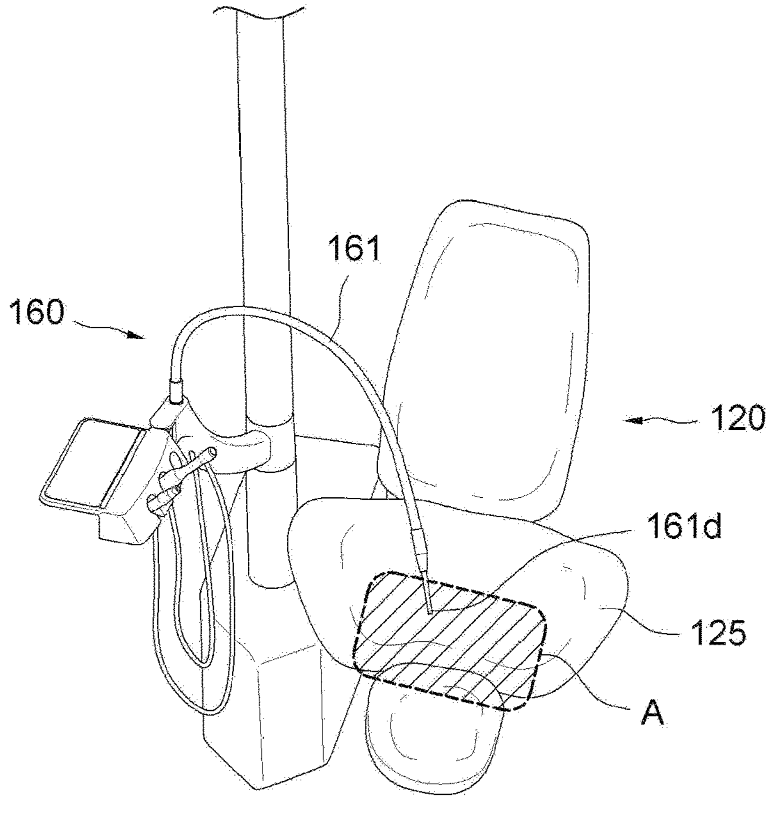
Figure 7:
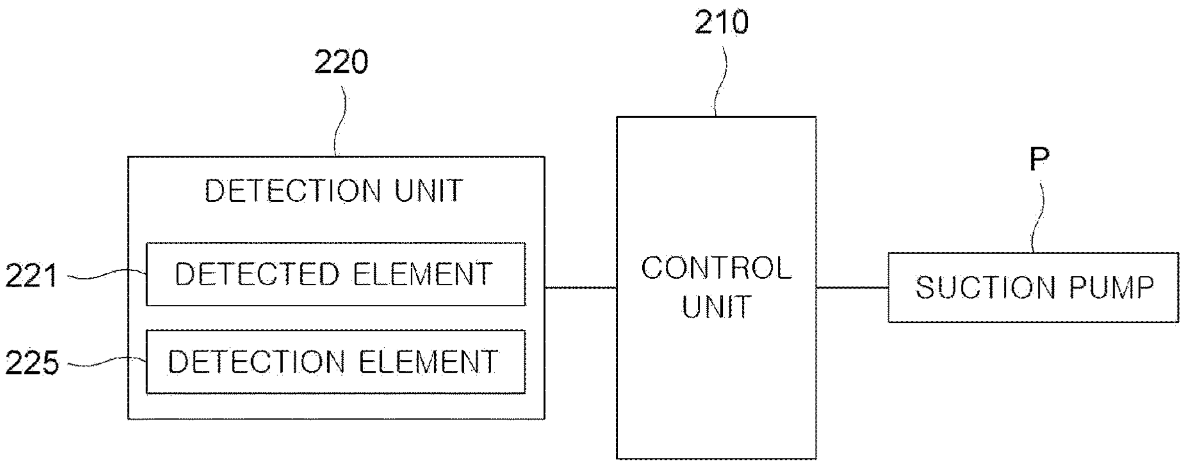
FIG. 7 is a block diagram for describing a method of controlling a suction pump P in relation to the position of the suction unit 160 in FIGS. 5 and 6.

FIGS. 5 and 6 are perspective views for describing the relationship between the position of the suction unit 160 and the corresponding area A, and FIG. 7 is a block diagram for describing a method of controlling a suction pump P in relation to the position of the suction unit 160 in FIGS. 5 and 6.

Referring to these drawings, after adjusting the seat unit 120 from the first posture to the second posture, a doctor may adjust the suction unit 160 from the fifth posture (see FIG. 5) to the sixth posture (see FIG. 6).

In the sixth posture, the movable end 161*d* of the suction unit 160 will be positioned in the corresponding area A corresponding to the upper support part 125. The position of the movable end 161*d* may be detected by the detection unit 220.

The detection unit 220 may include a detection element 221 and a detection element 225. The detected element 221 is a detection target of the detection element 225. The detected element 221 may be installed in the deformable suction line 161. The detection element 225 may be installed in the corresponding area A of the upper support part 125. The detection element 225 generates an electrical signal depending on the interaction with the detection element 221. When the detection element 221 is a magnet, the detection element 225 may be a hall effect sensor.

The control unit 210 may control the operation of the suction pump P based on information from the detection unit 220. Specifically, when the detection element 225 generates the electrical signal, the control unit 210 determines that the movable end 161*d* is positioned in the corresponding area A. The control unit 210 determines d that the suction unit 160 is positioned in the sixth posture and operates the suction pump P. As a doctor switches the suction unit 160 to the sixth posture, the suction unit 160 starts the suction function. Conversely, when the suction unit 160 switches to the fifth posture, the suction function is terminated. As the start/stop of the suction function is linked to the change in posture of the suction unit 160, the burden on the doctor for using the suction unit 160 is not large.

INDUSTRIAL APPLICABILITY

The present invention has industrial applicability in a manufacturing field of a dental unit chair.

The invention claimed is:

1. A dental unit chair, comprising:

a seat unit that is configured to switch between a first posture for supporting a patient to sit down and a second posture for supporting the patient to lie down;

a body unit that is positioned on one side of the seat unit and configured to maintain an independent state when switching between the first posture and the second posture;

an arm unit that is installed on the body unit to switch between a first posture and a second posture different from the first posture; and a suction unit that includes a fixed suction line arranged to extend in an inside of the arm unit and a deformable suction line connected to the arm unit while communicating with the fixed suction line, positioned outside the arm unit, and configured to maintain a deformed shape, the deformable suction line being configured to be in a state in which a foreign object is sucked from the patient as its entrance is converted from a first posture to a second posture close to the patient lying in the seat unit in the second posture, wherein the suction unit further includes an intermediation suction line that is built into the body unit and configured to make the fixed suction line communicate with a suction pump, and the suction unit is configured to allow the foreign object to flow in a direction toward the suction pump while sequentially passing through the deformable suction line, the fixed suction line, and the intermediate suction line, wherein the dental unit chair further comprises a detection unit configured to detect that the deformable suction line is positioned in a corresponding area corresponding to the seat unit; and a control unit configured to operate the suction pump communicating with the deformable suction line based on a detection result of the detection unit.

2. The dental unit chair of claim 1, wherein the arm unit includes an end surface forming a plane along a direction intersecting an extension direction thereof, and the deformable suction line is connected to the arm unit so as to protrude from the end surface.

3. The dental unit chair of claim 1, wherein the suction unit further includes a holder coupled to the arm unit, and a portion of the deformable suction line that is close to the fixed suction line maintains an arrangement along an extension direction of the holder by a support of the holder.

4. The dental unit chair of claim 1, further comprising:

an assist table that is switchably connected to the arm unit between a first posture and second posture, wherein a coupling surface of the arm unit to which the deformable suction line is coupled is the same surface as or a surface parallel to an upper surface of the assist table.

5. The dental unit chair of claim 1, wherein the deformable suction line includes:

a flexible tube that communicates with the fixed suction line; and a shape retaining body that surrounds the flexible tube and is configured to maintain a shape of the flexible tube.

6. The dental unit chair of claim 1, wherein the detection unit includes:

a detected element that is installed on the deformable suction line; and a detection element that is configured to generate an electrical signal according to interaction with the detected element positioned in the corresponding area.

7. A dental unit chair, comprising:

a base unit;

a seat unit that is installed on the base unit and configured to support a patient;

a doctor table that is connected to the base unit and has a handpiece mounted thereon;

an arm unit that is connected to the base unit so as to be positioned on an opposite side of the doctor table with respect to the seat unit; and a suction unit that includes a deformable suction line having a fixed end connected to the arm unit while communicating with a suction pump and a movable end movable with respect to the fixed end, the deformable suction line being configured to maintain a deformed shape according to the movement of the movable end and formed to cause a foreign object sucked from the patient to flow in a direction toward the suction pump while sequentially passing through the movable end and the fixed end, wherein the dental unit chair further comprises:

a detection unit configured to detect that the deformable suction line is positioned in a corresponding area corresponding to the seat unit; and a control unit configured to operate the suction pump communicating with the deformable suction line based on a detection result of the detection unit.

8. The dental unit chair of claim 7, further comprising:

an assist table that is rotatably connected to the arm unit, wherein the deformable suction line is positioned spaced apart from the assist table to maintain a state independent of a rotation of the assist table.

9. A dental unit chair, comprising:

a base unit;

a seat unit that is installed on the base unit and configured to support a patient;

a body unit that is connected to one side of the base unit;

an arm unit that is connected to the body unit; and a suction unit that includes a fixed suction line arranged to extend in an inside of the arm unit, a deformable suction line mounted on the arm unit while communicating with the fixed suction line and configured to maintain a deformed shape, and an intermediation suction line configured to make the fixed suction line communicate with a suction pump, wherein the dental unit chair further comprises:

a detection unit configured to detect that the deformable suction line is positioned in a corresponding area corresponding to the seat unit; and a control unit configured to operate the suction pump communicating with the deformable suction line based on a detection result of the detection unit.

10. The dental unit chair of claim 9, wherein the body unit includes a housing and a pole connected to the housing, the arm unit is connected to the pole, and the intermediation suction line is arranged to extend into the pole and the housing.

11. The dental unit chair of claim 9, wherein the arm unit includes an end surface forming a plane along a direction intersecting an extension direction thereof, and the deformable suction line is connected to the arm unit so as to protrude from the end surface.

12. The dental unit chair of claim 9, wherein the suction unit further includes a holder coupled to the arm unit, and a portion of the deformable suction line that is close to the fixed suction line maintains an arrangement along an extension direction of the holder by a support of the holder.

* * * * *